United States Patent
Kudo et al.

(10) Patent No.: US 7,239,046 B2
(45) Date of Patent: Jul. 3, 2007

(54) ELECTRIC POWER SUPPLY UNIT AND ELECTRIC POWER SUPPLY CONTROLLING METHOD

(75) Inventors: Kazuyuki Kudo, Kawagoe (JP); Akio Ozawa, Kawagoe (JP); Tatsuzo Hasegawa, Kawagoe (JP)

(73) Assignee: Pioneer Corporation, Tokyo-to (JP)

( * ) Notice: Subject to any disclaimer, the term of this patent is extended or adjusted under 35 U.S.C. 154(b) by 435 days.

(21) Appl. No.: 10/702,090

(22) Filed: Nov. 6, 2003

(65) Prior Publication Data

US 2004/0150264 A1  Aug. 5, 2004

(30) Foreign Application Priority Data

Nov. 6, 2002  (JP)  ............... 2002-321977

(51) Int. Cl.
*H02J 1/00* (2006.01)
(52) U.S. Cl. ...................................................... 307/82
(58) Field of Classification Search ................... 307/82
See application file for complete search history.

(56) References Cited

U.S. PATENT DOCUMENTS 4,323,787 A * 4/1982 Sato et al. ..................... 307/38
6,177,739 B1 * 1/2001 Matsudaira et al. ......... 307/125
6,328,394 B1 * 12/2001 Shirai et al. .................... 347/2
6,437,462 B1 * 8/2002 Maple et al. .................. 307/75
6,504,267 B1 * 1/2003 Giannopoulos ............... 307/31
6,720,862 B2 * 4/2004 Hazelton et al. ........... 340/5.64
6,930,404 B1 * 8/2005 Gale et al. ................. 290/40 C

FOREIGN PATENT DOCUMENTS

JP  9-291843  11/1997

\* cited by examiner

*Primary Examiner*—Chau N. Nguyen
*Assistant Examiner*—Dru Parries
(74) *Attorney, Agent, or Firm*—Nixon & Vanderhye, PC

(57) ABSTRACT

The electric power supply unit is provided with: a DC-DC converter in which a electric current is supplied through a backup line; the other DC-DC converter in which a electric current is supplied through an accessory line; and a voltage controlling circuit. The voltage controlling circuit controls the DC-DC converters so as to keep their output voltage at the same value.

8 Claims, 4 Drawing Sheets ns. 10 amperes for example, is not enough for an audio amplifier utilizing a DC-DC converter. In this case, it is necessary to use a dedicated wiring 120 having a large current-carrying capacity, such as 20 amperes, as described in FIG. 1. The audio amplifier described in FIG. 1 has a power amplifier unit 110 connected to an in-vehicle battery 1 through a connector 102. The power amplifier unit 110 is provided with: a pair of power amplifiers 111A and 11B; a DC-DC converter circuit 112 supplying a power supply voltage to the power amplifiers 111A and 111B; and an on-off detecting circuit 116 for controlling operations of the power amplifiers 111A and 111B by detecting on-off status of an accessory switch 6. Therefore, it is necessary to install the dedicated wiring 120 for passing a current from the battery 1, in a vehicle, and to use a fuse and a connector capable of being used for a current having a large capacity. Thus, complicated work and special components are needed.

ELECTRIC POWER SUPPLY UNIT AND ELECTRIC POWER SUPPLY CONTROLLING METHOD

BACKGROUND OF THE INVENTION

1. Field of the Invention

The present invention belongs to the technical field of electric power supply units and electric power supply controlling methods utilizing a plurality of electric power supply lines.

2. Related Background Art

In an audio amplifier for automobile use, it is known that a voltage of an in-vehicle battery is boosted with a DC-DC converter to increase an audio output as described in Japanese Patent Application Laid-open No. Hei-9-291843.

However, there is a case where a current-carrying capacity of a standard electrical wiring in a vehicle, which is 10 amperes for example, is not enough for an audio amplifier utilizing a DC-DC converter. In this case, it is necessary to use a dedicated wiring 120 having a large current-carrying capacity, such as 20 amperes, as described in FIG. 1. The audio amplifier described in FIG. 1 has a power amplifier unit 110 connected to an in-vehicle battery 1 through a connector 102. The power amplifier unit 110 is provided with: a pair of power amplifiers 111A and 11B; a DC-DC converter circuit 112 supplying a power supply voltage to the power amplifiers 111A and 111B; and an on-off detecting circuit 116 for controlling operations of the power amplifiers 111A and 111B by detecting on-off status of an accessory switch 6. Therefore, it is necessary to install the dedicated wiring 120 for passing a current from the battery 1, in a vehicle, and to use a fuse and a connector capable of being used for a current having a large capacity. Thus, complicated work and special components are needed.

SUMMARY OF THE INVENTION

An object of the present invention is to provide an electric power supply unit and electric power supply controlling method capable of easily increasing a capacity of a working current.

The above object of the present invention can be achieved by an electric power supply unit of the present invention. The electric power supply unit is provided with: a first electric power supply circuit in which an electric current is supplied from a first power supply line; a second electric power supply circuit in which an electric current is supplied from a second power supply line; and a controlling device which controls operations of both the first electric power supply circuit and the second electric power supply circuit so as to correlate to each other.

The above object of the present invention can be achieved by an electric power supply controlling method of the present invention. The method is provided with the processes of: controlling an operation of a first electric power supply circuit in which an electric current is supplied from a first power supply line so as to keep its voltage at a predetermined value; controlling an operation of a second electric power supply circuit in which an electric current is supplied from a second power supply line so as to keep its voltage at approximately same value as that of the first electric power supply circuit; detecting an on-off states of the second power supply line; controlling the operations of the first electric power supply circuit and the second electric power supply circuit so as to turn the circuits on when an on-status of the second power supply line is detected; and controlling the operations of the circuits so as to turn the circuits off when an off-status of the second power supply line is detected.

The above object of the present invention can be achieved by an electric power supply controlling method of the present invention. The method is provided with: a first controlling process of controlling an operation of a first electric power supply circuit in which an electric current is supplied from a first power supply line so as to keep its voltage at a predetermined value; a second controlling process of controlling an operation of a second electric power supply circuit in which an electric current is supplied from a second power supply line so as to keep its voltage at approximately same value as that of the first electric power supply circuit; a detecting process of detecting an on-off states of the second power supply line; a third controlling process of controlling the operations of the first electric power supply circuit and the second electric power supply circuit so as to turn the circuits on when an on-status of the second power supply line is detected; a fourth controlling process of controlling the operations of the circuits so as to turn the circuits off when an off-status of the second power supply line is detected; a determining process of determining whether or not the first and second controlling processes are necessary; and a switching process of switching between the implementation and the termination of the first and second controlling processes in response to a determination result in the determining process.

DETAILED DESCRIPTION OF THE PREFERRED EMBODIMENTS

Figure 1:
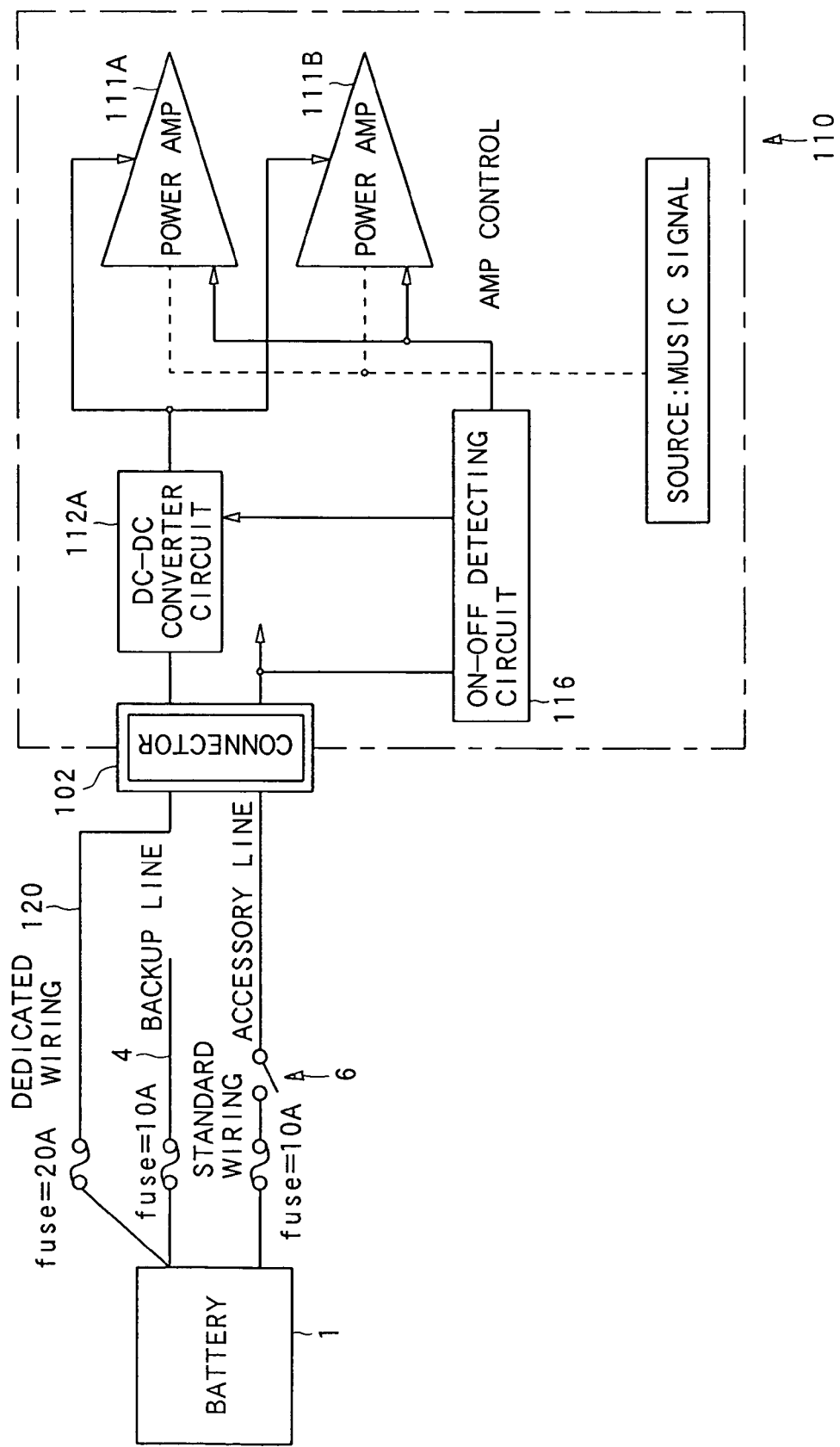
FIG. 1 is a block diagram showing the structure of a conventional electric power supply unit.
Figure 2:
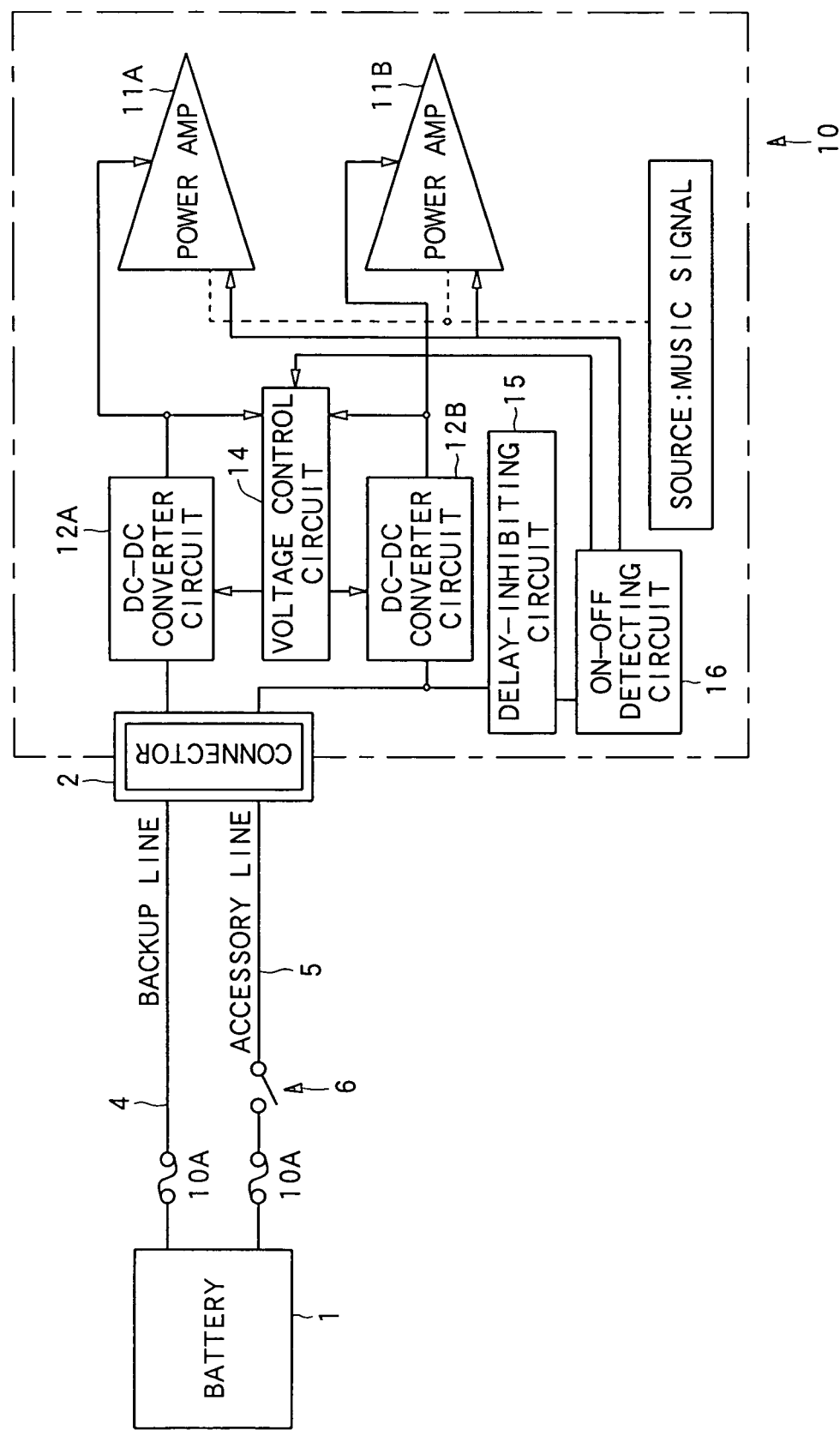
FIG. 2 is a block diagram showing the structure of an audio amplifier to which an electric power supply unit of a preferred embodiment of the present invention is applied.
Figure 3:
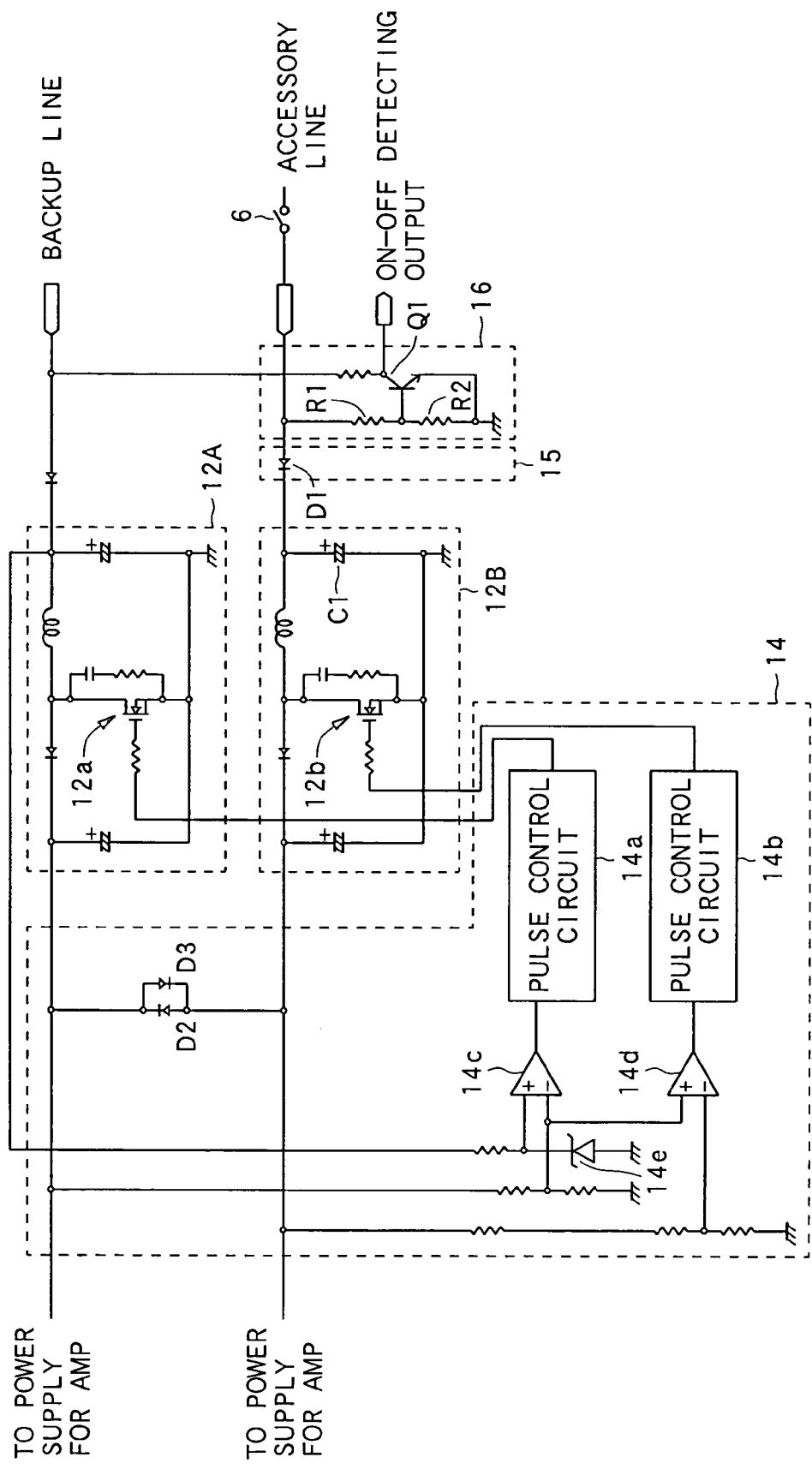
FIG. 3 is a circuit diagram of the audio amplifier.
Figure 4:
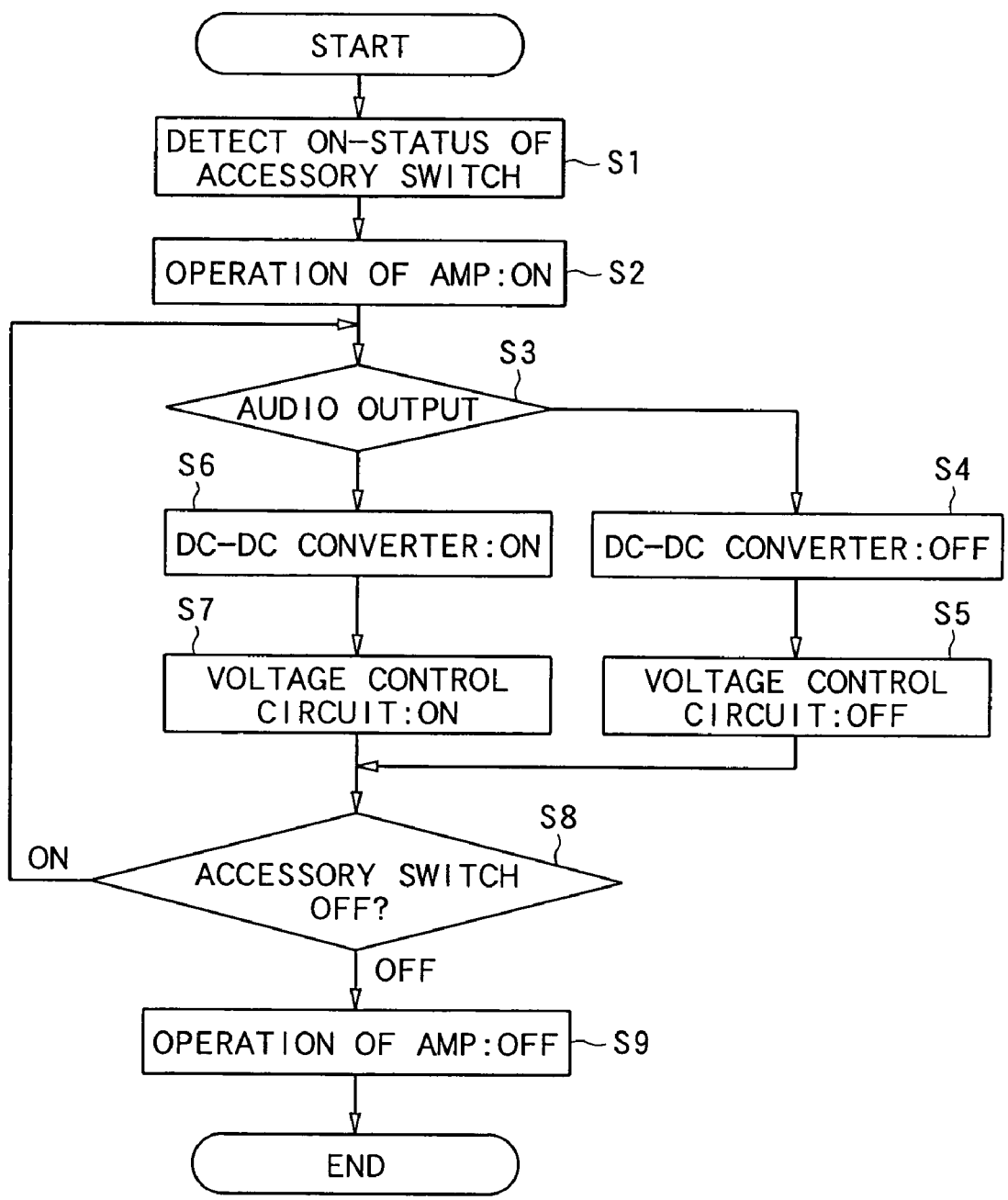
FIG. 4 is a flow chart indicating an operation in the audio amplifier.

Referring to FIGS. 2 to 4, a preferred embodiment of the present invention will be described. In the preferred embodiment, an electric power supply unit of the present invention is applied to an audio amplifier for automobile use.

FIG. 2 is a block diagram showing the structure of the audio amplifier to which the electric power supply unit of the preferred embodiment is applied. FIG. 3 is a circuit diagram indicating of a specific structure of the audio amplifier.

As shown in FIG. 2, the audio amplifier has a power amplifier unit 10 connected to a in-vehicle battery 1 through a connector 2. The power amplifier unit 10 is connected to the battery 1 through both of a backup line 4 and an accessory line 5. A fuse whose rated capacity is 10 amperes is connected to each line. An accessory switch 6, which is operated through an ignition key cylinder mounted in a vehicle, is inserted in the accessory line 5.

As shown in FIG. 2, the power amplifier 10 is provided with: a pair of power amplifiers 11A, 11B; DC-DC converter circuits 12A, 12B which supplies a power supply voltage to the power amplifiers 11A, 11B; a voltage control circuit 14 controlling an output voltage of the DC-DC converter circuits 12A, 12B; a delay-inhibiting circuit 15 for inhibiting a delay of an operation when turning off the accessory switch 6; and an on-off detecting circuit 16 for detecting on-off status of the accessory switch 6. The DC-DC converter circuit 12A is connected to the backup line 4, and the DC-DC converter circuit 12B is connected to the accessory line 5, through a connector 2 respectively.

As shown in FIG. 3, the DC-DC converters 12A and 12B comprises the same circuit as a general DC-DC converter, and have switching elements 12a and 12b respectively.

As shown in FIG. 3, voltage control circuit 14 is provided with: a pulse control circuit 14a which applies a control pulse to the switching element 12a of the DC-DC converter 12A; a pulse control circuit 14b which applies a control pulse to the switching element 12b of the DC-DC converter 12B; a voltage comparator circuit 14c; and a voltage comparator circuit 14d. Diodes D2 and D3 are connected in parallel in the direction opposite to each other between output lines of the DC-DC converter circuits 12A and 12B.

As shown in FIG. 3, the delay-inhibiting circuit 15 has a backflow-inhibiting diode D1 for inhibiting backflow of current when the accessory switch 6 is turned off. The on-off detecting circuit 16 has: resistors R1 and R2 which divide voltage of the accessory line 5; and a transistor Q1 which is turned off or turned on in response to divided voltage.

An operation of the audio amplifier of the preferred embodiment will be described hereinafter.

In the audio amplifier of the preferred embodiment, by operating the DC-DC converter circuits 12A and 12B, the voltages supplied through the backup line 4 and the accessory line 5 are increased to a preset voltage which is preset higher than the voltage of the battery 1, and then the preset voltage is applied to the power amplifiers 11A and 11B. It is possible to operate the audio amplifier without operating the DC-DC converter circuits 12A and 12B. In this case, the voltage of the battery 1 is applied to the power amplifiers 11A and 11B. Thus, it is possible to switch the operational status of the DC-DC converter circuits 12A and 12B between on and off. When operating the DC-DC converter circuits 12A and 12B, by increasing power supply voltage, it is possible to obtain larger audio output than that in the case of turning off the DC-DC converter circuits 12A and 12B.

The voltage control circuit 14 controls the DC-DC converter circuits 12A and 12B so as to suppress a voltage difference between output voltages of the DC-DC converter circuits 12A and 12B.

As shown in FIG. 3, the voltage comparator circuit 14c detects variations in an output voltage of the DC-DC converter circuit 12A with respect to a regulated voltage which is regulated with a Zener diode 14e. Then, the voltage comparator circuit 14c provides comparison results to the pulse control circuit 14a. The pulse control circuit 14a controls the DC-DC converter circuit 12A so as to keep its output voltage constant by outputting pulses to the switching element 12a in response to the comparison results.

The voltage comparator circuit 14d compares the output voltage of the DC-DC converter circuit 12A with that of the DC-DC converter circuit 12B. Then, the voltage comparator circuit 14d provides comparison results to the pulse control circuit 14b. The pulse control circuit 14b controls the DC-DC converter circuit 12B so as to keep its output voltage identical to that of the DC-DC converter circuit 12A by outputting pulses to the switching elements 12b in response to the comparison results.

By the above-explained operations, when operating the DC-DC converter circuits 12A and 12B, the voltage control circuit 14 controls the DC-DC converter circuits 12A and 12B so as to keep the output voltage of the DC-DC converter circuit 12A and 12B at an identical value which is set in advance. Therefore, it is possible to operate two power amplifiers under the same conditions all the time.

The diodes D2 and D3 in the voltage control circuit 14 have the function of keeping the voltage of output lines of the DC-DC converter circuit 12A and 12B at an approximately constant value when the DC-DC converter circuits 12A and 12B are not operated. When the DC-DC converter circuits 12A and 12B are not operated, the voltage of the battery is directly applied to the power amplifiers 11A and 11B in substance.

The delay inhibiting circuit 15 inhibits electrical charge, which is charged in a capacitor C1 of the DC-DC converter 12B, from flowing into the accessory line 5 when the accessory switch 6 is off. Further, it is possible to establish a ground for the accessory line 5 certainly by use of the resistors R1 and R2. Therefore, it is possible to detect rapidly that the accessory switch 6 becomes off in the on-off detecting circuit 16 which is described later.

The on-off detecting circuit 16 detects an on-off status of the accessory switch 6. When the accessory switch 6 becomes on, the transistor Q1 turns on and outputs an L signal as a detecting signal. When the accessory switch 6 becomes off, the transistor Q1 turns off and outputs an H signal as a detecting signal. As shown in FIG. 2, the detecting signal is supplied to the power amplifiers 11A, 11B and the voltage control circuit 14, so that it is possible to switch the operational statuses of the power amplifiers 11A, 11B and the voltage control circuit 14 in response to the on-off status of the accessory switch 6.

FIG. 4 is a flowchart diagram indicating a flow of operation of the audio amplifier. When the present invention has a configuration shown in FIGS. 2 and 3, substantially same operation as the processing shown in FIG. 4 is executed. However, the processing shown in FIG. 4 can be executed by use of a computer.

FIG. 4 indicates the operation in the case of switching the accessory switch 6 in the order of: off, on, and off. When the accessory switch 6 is switched from off to on, the on-off detecting circuit 16 detects that the accessory switch 6 becomes on (step S1). At this time, DC-DC converters 12A and 12B are not operated. When the power amplifiers 11A and 11B receive a detecting signal from the on-off detecting circuit 16, the power amplifiers 11A and 11B are operated (step S2). Then, it is determined whether or not the audio output is larger than a constant value (step S3). This determination can be done based on whether or not the level of input signal to the power amplifiers 11A and 11B is greater than a constant value.

In step S3, when it is determined that the audio output is not greater than the constant value, the DC-DC converters 12A and 12B becomes inoperative (step S4). Further, the voltage control circuit 14 becomes inoperative (step S5), and the processing goes to step S8. On the other hand, in step S3, when it is determined that the audio output is greater than the constant value, the DC-DC converters 12A and 12B becomes operative (step S6). Then, the voltage control circuit 14 becomes operative (step S7), and the processing goes to step S8.

In step S8, when the on-off detecting circuit 16 detects that the accessory switch 6 becomes off, the audio amplifier turns off (step S9). Then, the operation indicated in FIG. 4 is terminated. In step S8, when the on-off detecting circuit 16 detects that the accessory switch 6 becomes on, the processing returns to step S3.

Thus, the DC-DC converter circuits 12A, 12B and the voltage control circuit 14 are continuously controlled so as to be switched from on to off, or from off to on in response to the magnitude of the audio output until the accessory switch 6 is off.

As explained above, according to the electric power supply unit of the preferred embodiment, since currents are supplied from the backup line and accessory line previously provided in a vehicle, the current capacity can be increased without having dedicated lines. Therefore, it is unnecessary to do work operations for having dedicated lines. In addition, it is unnecessary to use special components. Accordingly, it is possible to increase the audio output very easily.

Since the electric power supply unit comprises: the DC-DC converter circuit 12A in which a current is supplied from the backup line 4; the DC-DC converter circuit 12B in which a current is supplied from the accessory line 5; and the voltage control circuit 14 which control the operations of the DC-DC converter circuit 12A and the DC-DC converter circuit 12B, it is possible to control the voltage of the two DC-DC converter circuits appropriately.

In the embodiment, the electric power supply unit works as a part of the audio amplifier for automobile use. An electric power supply unit of the present invention is not limited to an equipment for automobile use or an audio equipment. Further, in the embodiment, the backup line and the accessory line as two power line systems are connected to one battery. However, a battery connected to each electric line can be provided separately. In addition, an electric power source for supplying electric power to a plurality of power supply line systems is not limited to a battery. For example, a commercial power source can be used.

The entire disclosure of Japanese Patent Application No. 2002-321977 filed on Nov. 6, 2002 including the specification, claims, drawings and summary is incorporated herein by reference in its entirety.

What is claimed is:

1. An electric power supply unit comprising:
    a first electric power supply circuit connected to a first power supply line;
    a second electric power supply circuit connected to a second power supply line; and
    a first amplifier having a power supply input supplied with an output voltage of the first electric power supply circuit;
    a second amplifier having a power supply input supplied with an output voltage of the second electric power supply circuit; and
    a voltage control circuit comprising:
        a first comparator that compares the output voltage of the first electric power supply circuit and a reference voltage value;
        a second comparator that compares the output voltage of the first electric power supply circuit and the output voltage of the second electric power supply circuit;
        a first control circuit that controls the output voltage of the first electric power supply circuit to be substantially constant based on an output of the first comparator; and
        a second control circuit that controls the output voltage of the second electric power supply circuit to be approximately equal to the output voltage of the first electric power supply circuit based on an output of the second comparator.

2. The electric power supply unit according to claim 1, wherein the first and second power supply lines are connected to the same battery.

3. The electric power supply unit according to claim 1, wherein the first and second control circuits comprise respective pulse control circuits.

4. The electric power supply unit according to claim 1, wherein the first and second electric power supply circuits comprise DC-DC converter circuits.

5. The electric power supply unit according to claim 1, wherein the first and second electric power supply circuits are turned off if input signals supplied to the first and second amplifiers are less than a specified value.

6. The electric power supply unit according to claim 1, further comprising:
    a detecting circuit for detecting whether power is supplied to the second power supply line.

7. The electric power supply unit according to claim 6, further comprising:
    a delay inhibiting circuit for inhibiting electric charge from the second electric power supply circuit from flowing into the second power supply line when the detecting circuit detects that no power is supplied to the second power supply line.

8. An audio amplifier comprising the electric power supply circuit according to claim 1.

* * * * *